(No Model.) 4 Sheets—Sheet 3.

J. N. WILLIAMS.
TYPE WRITING MACHINE.

No. 586,255. Patented July 13, 1897.

Witnesses
Inventor
Attorneys (No Model.)  4 Sheets—Sheet 4.

J. N. WILLIAMS.
TYPE WRITING MACHINE.

No. 586,255.  Patented July 13, 1897.

Witnesses  Inventor

UNITED STATES PATENT OFFICE.

JOHN N. WILLIAMS, OF DERBY, CONNECTICUT.

TYPE-WRITING MACHINE.

SPECIFICATION forming part of Letters Patent No. 586,255, dated July 13, 1897.

Application filed January 11, 1896. Serial No. 575,066. (No model.)

*To all whom it may concern:*

Be it known that I, JOHN N. WILLIAMS, a citizen of the United States, residing at Derby, in the county of New Haven and State of Connecticut, have invented certain new and useful Improvements in Type-Writing Machines, of which the following is a specification.

The general character of the machine to which my improvements are applied has been shown and described in numerous prior patents granted to me, said machine comprising, essentially, a paper-carriage adapted to be moved both forward and backward from a normally central position, so as to receive impressions from any one of three type mounted upon each type-bar. The type-bars have the grasshopper movement and are mounted in two sets or series upon stationary frames arranged in front and rear of the movable paper-carriage.

The object of my present improvements is to simplify and perfect certain parts of the structure to render them more durable and effective, and thereby improve the work and prolong the life of the machine.

In order that my invention may be fully understood, I will first describe the same with reference to the accompanying drawings, and afterward point out the novelty with more particularity in the annexed claims.

In said drawings, Fig. 2 is a vertical longitudinal sectional elevation of the same, taken on the line 2 2 of Fig. 1. Figs. 2$^a$ and 2$^b$ are detail views of the adjustable connecting device between ratchet mechanism and spacing-bar. Fig. 3 is a detail sectional view showing the adjustable pivot and guide for the type-bar. Fig. 7$^a$ is a similar detail view showing a slightly-modified form of spring-pressed roller. Fig. 8 is a side elevation of the girder-track, showing a part of the carriage and a portion of the main movable rack-bar. Fig. 9 is a detail sectional view of a portion of the supporting-track, showing the antifriction-rollers. Fig. 10 is a plan view of the bar for confining the antifriction-rollers. Fig. 11 is a sectional elevation of a part of the frame and track supporting device, also showing the main centering-spring. Fig. 12 is an inside sectional elevation taken on the line 12 12 of Fig. 11, showing the main centering-spring in side elevation. Fig. 13 is a rear elevation of the paper-carriage, showing the platen and pressure-roller broken away in parts and showing the paper-feeding device. Fig. 14 is an inside detail sectional elevation taken on the line 14 14 of Fig. 13 in the direction of the arrows. Fig. 15 is a side elevation of the paper-feeding and carriage-shifting devices. Fig. 16 is a similar view of the same. Fig. 17 is a detail view of the feeding pawl and ratchet. Fig. 17$^a$ is a detail perspective view showing slotted bracket-arm of carriage with the spring-pressed lever in place therein. Fig. 18 is another detail view of the same, taken at right angles to Fig. 17 and omitting some of the parts. Fig. 19 is a perspective representation of the improved yoke connecting device for connecting the key-lever with the type-bar. Fig. 20 is a detail view showing the manner of supporting the removable paper-platen.

1 is the main frame of the machine, having extending up from it the main supporting-posts 2, upon which are mounted the auxiliary frames 3, having the type-bars pivoted therein. Each type-bar is provided with three characters, which are adapted to make an impression upon the platen in each of the three positions of the paper-carriage.

5 are the operating-keys, mounted, preferably, upon rods 6, which are secured in the forward ends of levers 7, pivoted in the main frame and connected through suitable links and levers with the individual type-bars. In connecting an operating-lever 7 with a type-bar which is not directly in line with it I employ a yoke-lever connection 8, (shown in Fig. 18,) which has one of its arms 8$^a$ pivoted to the end of a lever 7 and its other arm 8$^b$ connected to the rod 9, which connects with the bell-crank lever on the type-bar. The yoke-lever 8 is formed with perforated ears 8ᶜ, which are pivotally connected to ears 10ᵃ of a bracket 10, which is secured to the lever spacing-bar 11, extending transversely of the machine-frame. The spacing-bar 11 and plate 10 are slotted for the passage of the operating-levers 7.

12 are the ink-pads, supported in any suitable manner at the inner ends of the auxiliary frames 3, the type being normally supported in contact with the pads.

13 are posts extending up from the base-frame 1, one of which is provided at top with a small stud 14, which engages the downwardly-projecting flanges 15 of the girder track-frame 16 for confining the latter in its movements forward and back. The girder track-frame is supported upon the upper ends of rock-arms 17 and movably attached by means of screws or pins 18, (formed, preferably, with hemispherical heads,) which pass through countersunk openings in the track and are screwed into or otherwise secured to the rock-arms. The portions of openings in track 16 through which the shanks of screws 18 pass are sufficiently large to allow for a slight movement of the track upon the ends of the rock-arms 17, permitted by the rounded or hemispherical heads, a spring 19 being provided at each end of the girder track-frame to compensate for the loose joint, one end of each spring engaging the track-frame and the other end the rock-arm. The rock-arms 17 are formed integral with or otherwise secured to the rock-shaft 20, which is pivotally mounted at its ends upon the pointed journal-screws 21, which work in screw-threaded bushings 22, adjustably seated in threaded openings in the main base-frame 1. It will be observed that by reason of the connection between the girder track-frame and rock-arms 17, through screws or pins 18, countersunk openings in track 16, and yielding springs 19, said track will be allowed to move back and forth over the center in a practically horizontal plane when operated by the shifting device.

25 is the horizontally-sliding shifting-bar, secured to the under girder-frame of track 16, by means of the adjustable screw-threaded bushings 26, threaded into the girder-frame, and screws 27, which pass through suitable openings in the right-angled ears or lugs 28 of the bar 25 and engage in the threaded openings of bushings 26. The ears or lugs 28 are arranged one above the other. By reason of the threaded bushings 26, which have screw-nicks by which they can be independently adjusted in the girder-frame, the shifting-bar 25 can be readily secured to the girder-frame of track 16, and at the same time the vertical plane of the girder track-frame can be adjusted to insure the horizontal position of the track. The adjustable bushings 21 are also very important in affording a ready means for accurately adjusting the longitudinal position of the shifting-bar with relation to the shifting-lever, so as to insure the proper engagement and working of the lugs of the automatic locking device. The adjustment can be regulated to a nicety by this means and is very important in producing the best results with the machine. The shifting-bar 25 extends toward the front of the machine and at its forward end is provided with a guide portion resting on a suitable flange or projection extending up from the base-frame.

30 is a double-arm shifting-lever pivoted to a lug 31 of the main frame and having the keys 32 and 33, which are depressed for moving the carriage backward and forward, respectively. The lever 30 is suitably connected to the shifting-bar 25, so as to cause said bar to slide forward and back when it is moved on its pivot. Suitable automatic locking devices and springs and locks are employed in connection with the shifting-lever 30, but these are not specifically illustrated and described in the present case, as they are covered by my application Serial No. 575,065, filed of even date herewith.

35 is the main centering-spring, coiled around the end of rock-shaft 20 and having its opposite ends or legs 36 and 37 extending up to a point beneath the track 16, where they engage opposite sides of a central lug 38, projecting beneath the track. A lug 39 extends inwardly from one of the posts 13 to keep the spring 35 in position and enable it to act upon the lug of the track-frame for returning and normally holding the track-rail and other parts in central position.

40 is the paper-carriage, having an under track 41, corresponding to the track 16, and 42 are ball-bearings supported between the tracks 16 and 41 for reducing the friction of the carriage in its movement transversely of the machine. The balls 42 are held at proper distance apart between the tracks 16 and 41 by means of the bar or plate 43, having heads 44, with approximately square openings 45, in which the balls operate.

46 are screws projecting upwardly in the track 16 at proper points to limit the movement of the balls 42.

The carriage 40 carries the paper-feeding mechanism, paper-guides, and platen, which will presently be referred to and particularly described.

50 is the feed rack-bar, pivotally mounted upon the ends of small links, (not shown,) which are pivoted to the carriage-frame in inclined position, so that in pushing the paper-carriage to the right the rack-bar 50 will rise over the ratchet presently to be described.

The rack-bar 50 is confined between the downwardly-projecting cast lugs 51, preferably formed integral with the carriage-frame, and a grooved roller or head 52, journaled upon or formed integral with the outer end of the pin 53. The grooved head 52 engages the rack-bar 50 preferably at a point close to the ratchet in order to closely confine the rack-bar against lateral movement and insure the perfect operation of the ratchet. 54 is a leaf-spring secured to carriage 40 and engaging rack-bar 50 for holding it in normal position.

Figure 1:
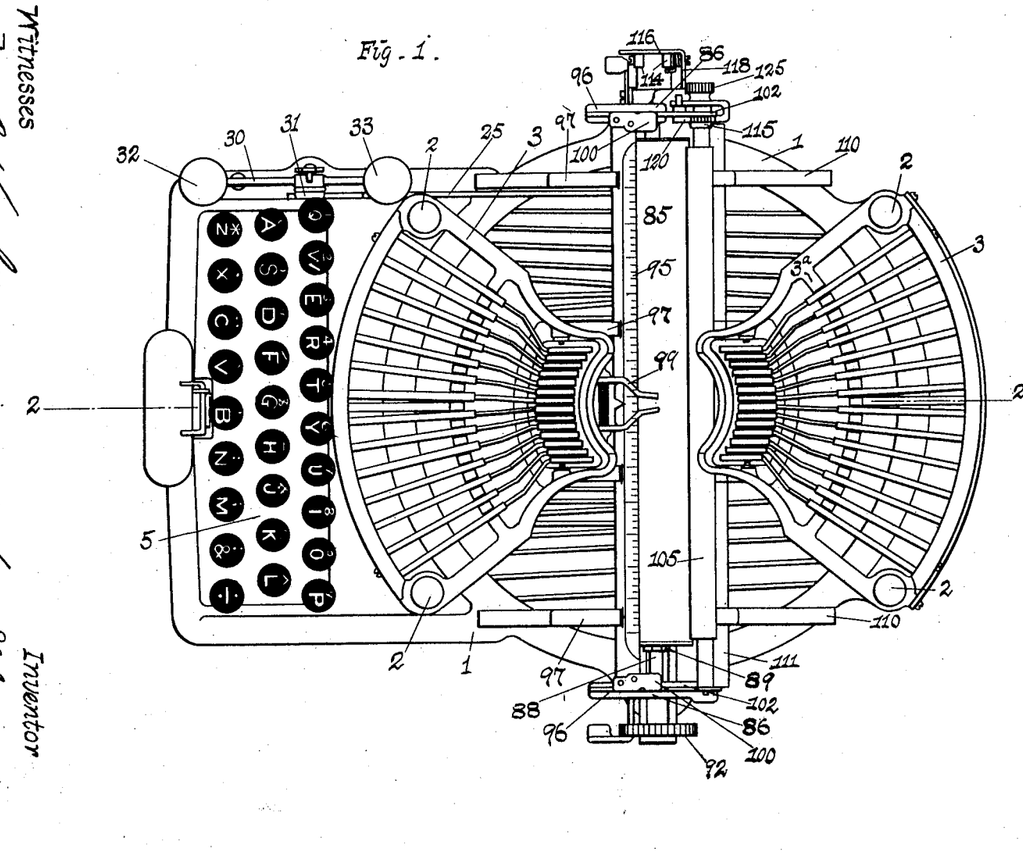
Figure 1 is a general plan view of a type-writing machine embodying my improvements.
Figures 2, 2A, 2B, 3:
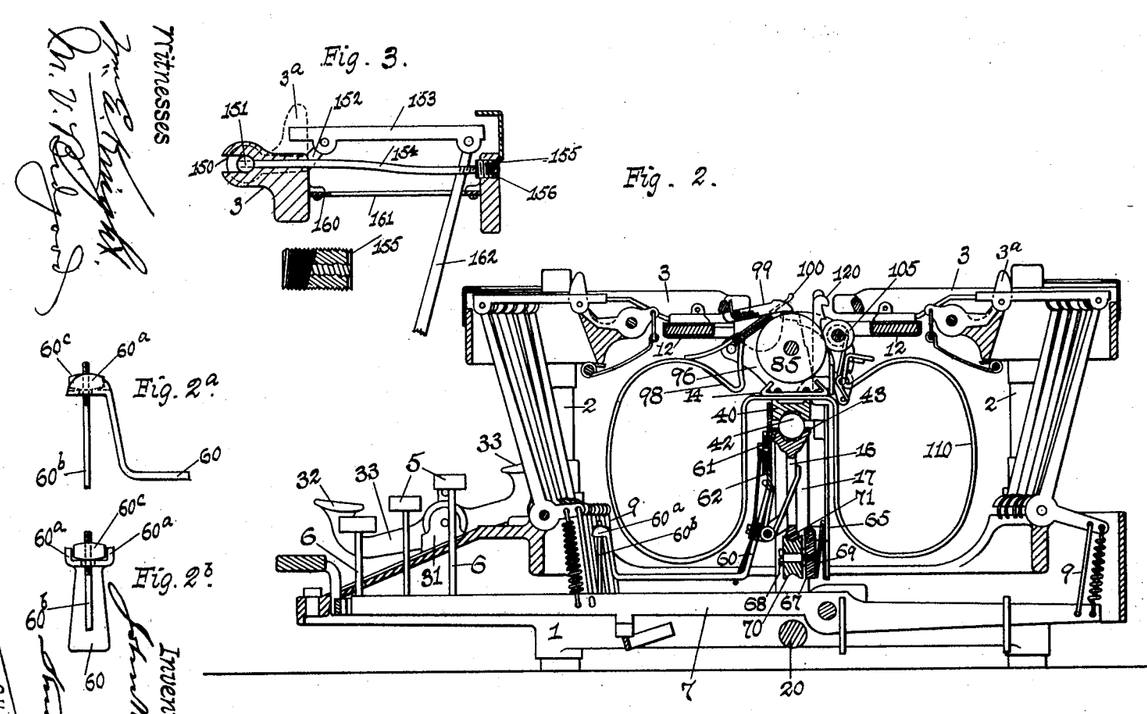
Figure 4:
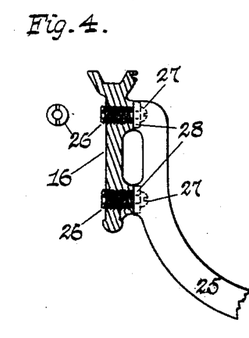
Figs. 4 and 4$^a$ are detail elevations illustrating the improved means for connecting the shifting-bar to the movable track upon which the carriage operates.
Figure 4A:
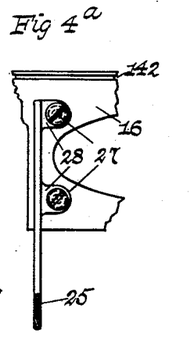
Figure 5:
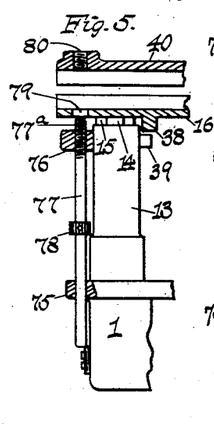
Figs. 5 and 6 are detail elevations, partly in section, of parts of the supporting-frame and carriage, showing the device for locking the carriage and track against movement.
Figure 6:
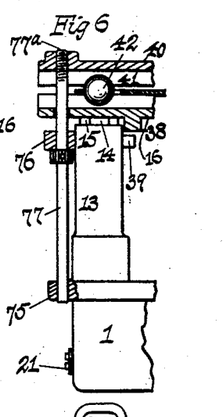

The ratchet I prefer to employ is fully shown and described in my copending application, Serial No. 575,065. It consists of a pivoted frame 60, carried by the girder track-frame 16 and having formed integral with it at its upper end a short rack 61, upon which is mounted a second sliding short rack 62. The rack 61 is normally in engagement with the main rack-bar 50. I prefer to connect the pivoted ratchet-frame 60 to the space-bar by the adjustable device shown in Figs. 2$^a$ and 2$^b$. The forward end of arm of frame 60 is formed with a pair of upwardly-bent ears or lugs 60$^a$ and an opening through which passes a threaded connecting-rod 60$^b$, which is connected to the spacing-bar.

60$^c$ is a small nut threaded upon upper end of rod 60$^b$ and formed with curved faces or elevated ridges or central portions upon its opposite faces, which ridges are adapted to bear against the arm and rock thereon in the operation of the device. To adjust the connection, it is only necessary to push the rod up through the opening in arm 60 until the nut is free of the ears, when it can be turned up or down on the rod to lengthen or shorten it.

65 is a bar secured rigidly at top to the carriage 40 and extending downwardly parallel to the girder-frame and carrying at its lower end ears 66, in which is pivoted the bracket 67, carrying the journal pin or screw 68.

69 is a V-spring confined between the bar 65 and bracket 67 for giving the bracket 67 an upward tendency on its pivot. 70 is a grooved roller journaled upon the pin 68 and engaging a track 71, formed on the lower edge of the girder track-frame 16. It will be observed that the grooved roller 70, operating on the track 71, confines the carriage 40 upon the girder track-frame 16 with a yielding pressure, the spring 69 giving sufficiently to accommodate any slight inequalities in the track and to take up all backlash.

Figure 7:
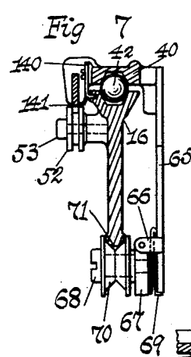
Fig. 7 is a transverse sectional elevation of the supporting-track and a part of the carriage, showing the manner of mounting the latter upon the former.
Figures 7A, 8, 9, 10, 12:
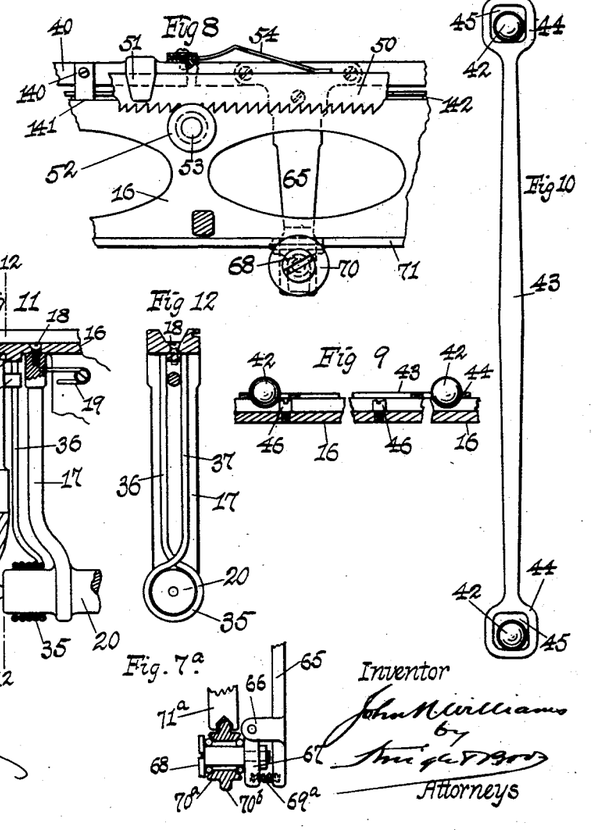

I consider the modified form of roller and track shown in Fig. 7$^a$ the full equivalent of the form shown in the other figures. In this modified form I form the track 71$^a$ with a V-groove and the roller 70$^a$ with an annular rounded flange or rib 70$^b$, working therein. The roller is also provided with ball-bearings, and a spiral spring 69$^a$ is substituted for the V-spring.

75 and 76 are lugs or flanges projecting out from the main frame adjacent to the auxiliary posts 13 and having vertical openings through them in which is seated a vertically-movable rotatable locking-bolt 77, carrying a milled roller 78, by means of which it can be operated. The shiftable track 16 has a vertical opening 79 extending through it, and the traveling carriage 40 has a vertical threaded opening 80 adjacent to its end. By raising the bolt 77 in its bearings it will pass through the opening 79. When the carriage is shifted into proper position, its upper threaded end 77$^a$ can be rotated into engagement with the threaded opening 80. I prefer to provide a bolt 77 at each side of the machine, and by means of them I am enabled to securely lock the carriage and shifting frame against any movement, so that the machine can be safely transported for any distance.

85 is the main paper-platen, removably journaled in the upright brackets 86 of the paper-carriage.

87 is a stationary centering-journal in one of the brackets 86, and 88 is a longitudinally-rotatable journal-rod journaled in the other bracket 86 and carrying at its inner end a clutch-bar 89, having pins 90. (See Fig. 20.) A spiral spring 91 is confined between the clutch-bar 89 and bracket 86, and keyed to the outer end of the journal-rod 88 is a milled operating wheel or roller 92, by means of which the journal-rod 88 can be moved longitudinally against the action of the spiral spring and the paper-platen can be rotated forward and back at will for inserting the paper. The paper-platen is provided at one end with a journal-opening 93 and at the opposite end a pair of journal-openings 94, the opening 93 engaging the centering-journal 87, while the openings 94 receive the pins 90 of the clutch-bar 89.

95 is the scale-bar, pivoted to the brackets 96, extending from the brackets 86. Scale-bar 95 has connected to it at intervals along its length the upper ends of the curved spring paper-guides 97, which are formed with the angular portions 98 for properly guiding and confining the paper.

99 is the pivoted type-block guide, pivoted to the forward auxiliary frame 3 above the scale-bar 95.

100 are the operating-fingers, secured to the scale-bar 95 at its ends.

Figures 13, 14, 15, 16, 17, 17A, 18, 19, 20:
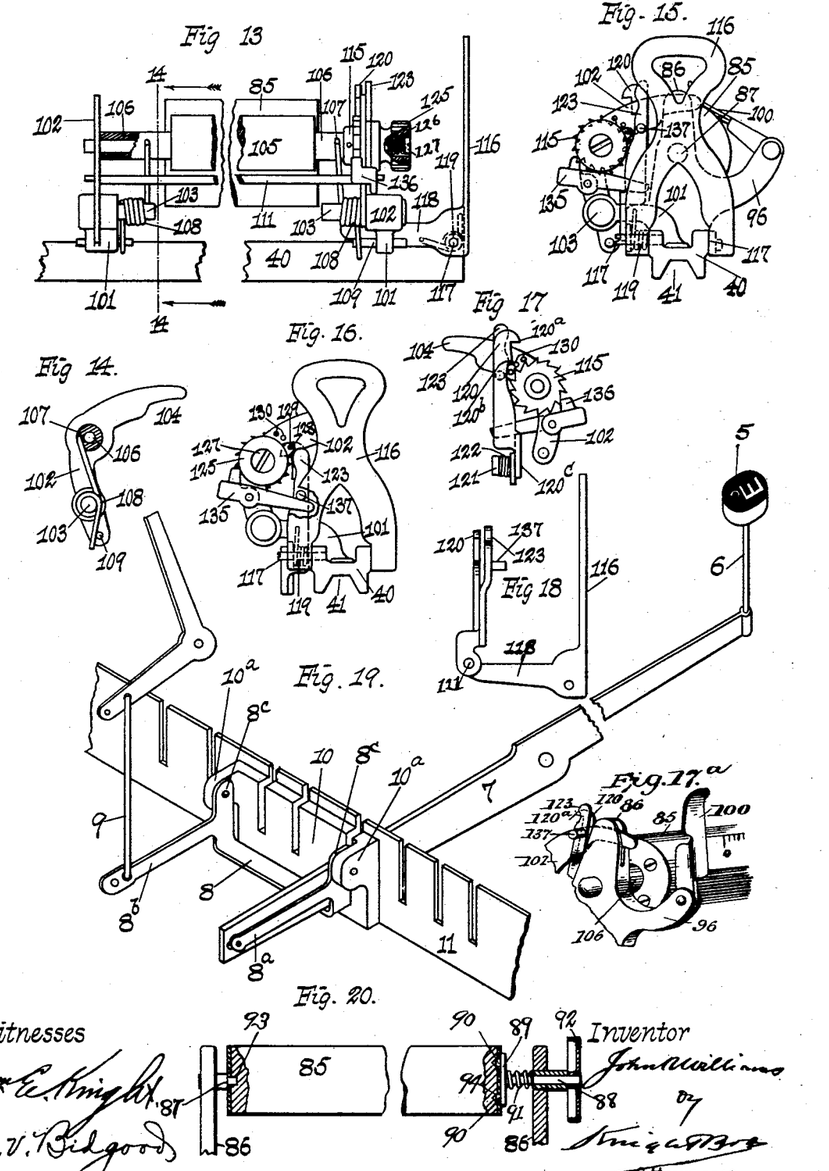

101 are bracket-arms formed integral with and extending from the carriage-frame, and 102 are curved arms pivoted to the brackets 101 upon the pins 103 and formed with fingers 104 at their upper ends, which engage in slots formed in the upper ends of the bracket-arms 86. (See Fig. 17$^a$.)

105 is the pressure feed-roller, journaled in the arms 102.

106 are collars loosely mounted upon the journal ends of the pressure-roller 105 and formed with transverse grooves or notches 107, in which engage the upper ends of springs 108, which are mounted upon the journal-pins 103 and have their opposite ends confined by the pins 109. The springs 108, acting against the collars 106, will hold the roller 105 pressed against the platen 85, and by reason of the collars 106 the free rotation of the roller 105 is not interfered with.

110 are the rear paper-guides, which are continuations of the forward paper-guides and are secured at their ends to the bar 111, which is also pivotally mounted in the levers 102.

The central portions of the paper-guides 97 and 110 extend across the central lower portion of the paper-carriage and are securely fastened thereto. Keyed to one end of the journal of the presser-roller 105 is a small ratchet 115, which is adapted to be engaged by a hand-operated vertically-moving pawl, which will now be described.

116 is a lever pivoted to the carriage at 117 and formed with an inwardly-extending arm 118.

119 is a spring surrounding the pivot 117 and engaging the carriage-frame and the lever 116 for holding it in normal position.

120 is a vertically-reciprocating pawl formed with two teeth $120^a$ and $120^b$. The pawl 120 has a lower right-angled extension $120^c$, from which extends a headed pin 121, which passes loosely through a journal-opening formed in the inner end of the lever-arm 118.

122 is a spiral spring confined between the arm 118 and head of pin 121 to compensate for the loose joint between the pawl and the lever-arm, allowing said pawl to move freely on its pivot in the plane of the arm 118 and have a slight movement at right angles to the plane of said arm.

The purpose of the spring-compensated joint between the pawl and its supporting and operating lever is to hold the pawl in engagement with the ratchet with a yielding pressure without interfering with its free movements.

The pawl 120 projects vertically from the arm 118 in operative relation to the small ratchet-wheel 115 and is adapted to reciprocate tangentially to the ratchet-wheel and when pulled downwardly by the movement of the lever 116 to rotate the paper-feed roller 105 by its engagement with said ratchet-wheel. Secured to the pawl 120 is an arm 123, which extends parallel to the pawl and passes on the opposite side of the lever 102. By the engagement of the pawl and arm 123 on opposite sides of the finger 104 the vertical position of the pawl is maintained.

125 is a rotatable longitudinally-movable head journaled upon the extended journal of the presser-roller 105 and confined upon said journal by means of a small spiral spring 126 and a headed screw 127, which work in a cavity formed in the head 125 and allow the head to rotate freely on the journal by being pulled outwardly slightly thereon. The head 125 is formed with a small cam-finger 128 and an inwardly-projecting pin 129, which is adapted to engage in one of the series of holes 130, formed in one of the levers 102 for holding the head with its cam-finger in the desired position. The object of the rotatable head with its cam-finger is to regulate the spacing of the written work, which result is accomplished by the engagement of the cam-finger 128 with the arm 123, causing the pawl 120 to disengage from the ratchet 115 after it has moved it a certain distance. If the head 125 is rotated until the pin 129 engages in the first or uppermost hole 130, it will be observed that the pawl will not be particularly influenced thereby, but when the head is rotated into the position for the pin 129 to engage the third or lowermost hole 130 it will be observed that the cam-finger 128 will act upon the arm 123 sooner and hold the pawl out of engagement with the ratchet 115 for a greater portion of its stroke.

To positively stop the movement of the feed-roller 105 at the end of the stroke of the actuating-pawl 120, I provide a lever 135, pivoted to the lever-arm 102 just below the ratchet 115 and formed with a curved finger 136, which projects up to a point adjacent to the teeth of ratchet 115. The lever 135 extends alongside of the arm 123, which arm is provided with a lug 137, which is adapted to engage the lever 135 and force the finger 136 into positive engagement with the ratchet 115 at the extreme lower end of the stroke of pawl 120. By this means the feed of the paper is made positive.

140 is an arm or plate secured to the carriage and formed with an inbent lower end 141, which runs freely in a longitudinal groove 142, formed in the track-frame 16. I preferably provide one of the plates 140 at each end of the carriage, their purpose being to afford auxiliary guards for preventing the carriage leaving the track or having too much movement thereon.

145 are angular paper-guides secured to the carriage directly beneath the platen and comprising short bars having their ends bent inwardly at an acute angle. These paper-guides are arranged at intervals along the carriage, corresponding to the paper-guides 97 and 110.

In Fig. 3 I have shown an improvement on the adjustable type-bar pivot described and claimed in my Patent No. 528,578, of November 6, 1894, and also a guide for the type-bar lever. 3 is the auxiliary frame, having the guide-comb $3^a$ (indicated by dotted lines) preferably omitted. 150 is a curved slot formed in the auxiliary frame, and 151 are the movable bearings upon which the fulcrum-levers 152 of the type-bars 153 are mounted. 154 is a springy rod connected to bearing 151 and extending through an opening in the frame and having a threaded end which is engaged by an adjusting-nut 155. The nut 155 is interiorly and exteriorly threaded, the interior and exterior threads differing either in pitch or in the direction of the thread, or both, for the purpose soon to appear. The nut 155 is seated in a threaded opening 156 in the frame slightly below the horizontal plane of the bearing 151, so that if it is necessary to bend the springy rod 154 it must be bent or bowed slightly out of line to pass into the nut seated in said opening. When the rod is put in place, the nut is screwed into its bearing, and the operation of screwing the nut in will draw the rod lengthwise for the reason that the internal thread will be of greater pitch than the external thread of the nut, and to make the action even quicker it may be formed in a different direction in addition to being of deeper pitch. 160 is a plate secured to the auxiliary frame in any suitable manner and formed with elongated slots 161, in which the type-bar levers 162 are guided to prevent vibration of the type-bars in operation. The plate 160 obviates the necessity of the guide-comb 3ª and thereby reduces the weight of the machine.

Certain features of the carriage-feeding mechanism, the carriage shifting, centering, and locking mechanisms, the ink-pad attachment, and the type-block guide illustrated and described, but not claimed herein, are claimed as far as novel in my copending application, filed of even date herewith, Serial No. 575,065.

Having thus described my invention, what I claim, and desire to secure by Letters Patent, is—

1. In a type-writing machine, the combination of the rock-arms, the shiftable track, the pins or screws passing through and loosely engaging perforations in the track and secured to the rock-arms, springs engaging the track and rock-arms for yieldingly connecting them, a centering-spring for the track, a carriage mounted on the track, and means for shifting the track horizontally, substantially as set forth.

2. In a type-writing machine, the combination of the frame, the rock-shaft journaled therein and provided with rock-arms, the shiftable track-frame mounted upon the rock-arms, and having a yielding connection therewith, a suitably-supported centering-spring engaging the shiftable track and frame, a carriage mounted on the track, and means for shifting the track and carriage in a horizontal plane, substantially as set forth.

3. In a type-writing machine, the combination of the rock-arms, the shiftable track mounted thereon and connected through a yielding connection, the carriage mounted on the track, the centering-spring, a shifting-bar connected to the track for shifting it in a horizontal plane, a shifting-lever having operative connection with the shifting-bar, and suitable means for adjusting the relation of the shifting-lever and shifting-bar, as set forth.

4. In a type-writing machine, the combination of the rock-arms, the shiftable track mounted thereon and having yielding connection therewith, the carriage mounted on the track, suitable spring-centering device, a shifting-bar connected with the track, and means for adjusting the relation of the shifting-bar and track, substantially as set forth.

5. In a type-writing machine, the combination of the shiftable track mounted upon a suitable support, a carriage working on the track, a centering-spring, a horizontally-sliding shifting-bar, and adjustable means for connecting the shifting-bar with the shiftable track comprising bushings threaded into the carriage-frame and screws passing through the bar and engaging the bushings, as set forth.

6. In a type-writing machine, the combination of a suitable main frame, the shiftable track-frame mounted upon said main frame, a carriage working on the track, a centering-spring, a longitudinally-sliding shifting-bar supported on said frame and having two or more perforated right-angled ears or lugs arranged one above the other at its end, adjustable internally-threaded bushings seated in said track-frame, headed screws passing through the perforations of the right-angled lugs and engaging the threaded bushings, and means for operating the shifting-bar, substantially as set forth.

7. In a type-writing machine, the combination of the post 13 of the machine-frame, the perforated lugs on the post, the traveling paper-carriage, and a longitudinally-movable bolt mounted in said lugs and adapted to engage the carriage for locking it against movement, as set forth.

8. In a type-writing machine, the combination of the machine-frame, the shiftable track mounted thereon, the carriage on the track and a longitudinally-movable bolt mounted on the machine-frame and adapted to engage the track and carriage and lock them against movement, as set forth.

9. In a type-writing machine, the combination of the machine-frame, a shiftable track mounted thereon and formed with a bolt-opening, a carriage on the track also formed with a bolt-opening, one of said openings being screw-threaded, and a bolt mounted in the machine-frame and formed with a threaded portion and adapted to engage the bolt-openings in the track and carriage, as set forth.

10. In a type-writing machine, the combination of a girder track-frame, a carriage traveling on the track, an arm extending from said carriage, a block pivoted to lower end of said arm and having a wheel or roller journaled to it, said wheel or roller engaging and traveling upon the lower edge of the girder track-frame, and a spring between the pivoted block and arm, as set forth.

11. In a type-writing machine, the combination of a girder track-frame, a carriage traveling on the track, an arm extending from the carriage and formed with ears or lugs, a trunnion-block pivoted between said ears or lugs and carrying a journal-pin, a wheel or roller journaled upon said pin and engaging and traveling upon the lower edge of the girder track-frame, and a spring confined between the arm and trunnion-block for holding the grooved roller in position and to take up backlash, as set forth.

12. In a type-writing machine, the combination of the type-bar, and the pivoted key-lever, out of plane with each other, with the pivotally-mounted yoke-lever 8 having one arm connected to the key-lever and the other arm connected to the type-bar, substantially as set forth.

13. In a type-writing machine, the combination of the type-bar, and the pivoted key-lever out of plane with each other, with the pivotally-mounted yoke-lever 8 having arms $8^a$ and $8^b$ and pivot-ears $8^c$, one of said arms being connected to the key-lever and the other arm being connected to the type-bar, substantially as set forth.

14. In a type-writing machine, the combination of the carriage, the paper-platen journaled therein, the arms pivoted to the carriage, a pressure feed-roll journaled in said arms, notched or grooved collars loosely journaled on the journal ends of the pressure feed-roll, springs engaging the notches of the collars and holding the roll against the platen, and means for operating.

15. In a type-writing machine, the combination of the carriage, the paper-platen journaled therein, the slotted bracket-arms, the arms pivoted to the carriage and engaging in the slots of the brackets, the pressure feed-roll journaled in said arms, notched or grooved collars loosely mounted on the journal ends of the feed-roll, springs mounted on the carriage and engaging the notches of said collars, and means for operating, as set forth.

16. In a type-writing machine, the combination of the carriage, the platen journaled therein, the arms pivoted to the carriage, the pressure feed-roll journaled in the arms, a ratchet-wheel keyed to the feed-roll, a vertically-movable pawl engaging the ratchet-wheel and working on one side of one of the pivoted arms and formed with an arm which works on the other side of said pivoted arm to guide the pawl, and an operating-lever pivoted to the pawl, as set forth.

17. In a type-writing machine, the combination of the carriage, the platen journaled therein, the feed-roll, the ratchet keyed to the feed-roll, the pawl-engaging ratchet, and a pivoted operating-lever loosely pivoted to the pawl and having a spring to compensate for the looseness of the joint and hold the pawl in engagement with the ratchet with a yielding pressure, as set forth.

18. In a type-writing machine, the combination of the carriage, the platen, the feed-roll, the ratchet-wheel on the feed-roll, the vertically-movable pawl having a headed pin at its lower end, a pivoted operating-lever having a right arm formed with an opening through which the headed pin loosely passes, and a spring compensating for the looseness of the joint and yieldingly holding the pawl to its work, as set forth.

19. In a type-writing machine, the combination of the carriage, the platen journaled therein, the arms pivoted to the carriage, and supporting the feed-roll, the ratchet-wheel on the feed-roll, a pawl provided with a controlling-arm, the pawl and arm straddling one of the levers, means for operating the pawl, and means for engaging the arm for controlling the pawl, as set forth.

20. In a type-writing machine, the combination of a carriage, a platen journaled therein, and a feed comprising a ratchet-wheel, a pawl adapted to engage the ratchet-wheel and provided with a controlling-arm, and an adjustable cam in engagement with the controlling-arm to cause the pawl to reciprocate tangentially to the ratchet-wheel; said cam being adjustable for throwing the pawl out of engagement with the ratchet at different parts of its stroke for regulating the feed action, substantially as set forth.

21. In a type-writing machine, the combination of a carriage, a platen journaled therein, and a feed comprising a ratchet-wheel, an adjustable cam and a pawl reciprocating tangentially to the ratchet-wheel and in engagement with the adjustable cam, said cam being adapted to regulate the nearness of the pawl to the ratchet-wheel for controlling the length of feed, substantially as set forth.

22. In a type-writing machine, the combination of a carriage, the platen journaled in the carriage, a feed-roll provided with a ratchet-wheel, a reciprocating pawl supported tangentially to the ratchet-wheel, and an adjustable cam supported in engagement with the pawl and adapted to determine the distance of the pawl from the ratchet-wheel for regulating the length of feed, without interfering with the free reciprocation of the pawl, substantially as set forth.

23. In a type-writing machine, the combination of a carriage, a platen journaled therein, a feed-roll provided with a ratchet-wheel, a pawl, a rotatable head having a cam-finger adapted to control the action of the pawl, and means for adjusting head and holding it in adjusted position, as set forth.

24. In a type-writing machine, the combination of a carriage, a platen journaled therein, a feed-roll provided with a ratchet-wheel, a pawl adapted to operate the ratchet-wheel, an adjustable head having a cam-finger which is adapted to control the action of the pawl, a pin carried by the head, and a support for the head having a series of perforations with which said pin can engage, as set forth.

25. In a type-writing machine, the combination of a carriage, a platen journaled therein, a feed-roll provided with a ratchet-wheel, a pawl adapted to operate the ratchet-wheel, a head loosely journaled on the extended journal of the feed-roll and confined thereon by a spring and screw, a cam-finger and pin on said head, and a support having a series of perforations or holes in which the pin engages, as set forth.

26. In a type-writing machine, the combination of a carriage, a platen journaled therein, a feed-roll provided with a ratchet-wheel, a pawl adapted to operate the ratchet-wheel, and a lever operated by the pawl adapted to engage and arrest the movement of the ratchet-wheel at the end of the stroke of the pawl, as set forth.

27. In a type-writer, the combination of the spacing bar or lever, suitable ratchet mechanism, an operating-arm extending from the ratchet mechanism and formed with a pair of ears or lugs at its end, a threaded rod extending from the spacing bar or lever and passing through an opening in the ratchet-operating bar, and a threaded nut engaging said threaded rod and confined between said ears or lugs, as set forth.

28. In a type-writer, the combination of the spacing bar or lever, suitable ratchet mechanism, an operating-arm extending from the ratchet mechanism and formed with a pair of ears or lugs at its end, a threaded rod extending from the spacing bar or lever and passing through an opening in the ratchet-operating bar, and a threaded nut formed with elevated ridges or central portions which bear upon the operating-arm, said nut engaging said threaded rod and confined between said ears or lugs, as set forth.

29. In a type-writing machine, the combination of the type-bars suitably mounted in the machine-frame, and the type-bar levers pivotally connected to the type-bars, with a plate 161 formed with guide-slots through which the type-bar levers extend and operate, whereby the type-bars are guided and held against vibration when operating, as set forth.

30. In a type-writer, the combination of a type-bar, a pivot therefor, a springy screw-pin connected to said pivot and adapted to pass through an opening in the frame out of the plane of the pivot, and a nut engaging the threaded portion of said springy screw-pin, as set forth.

31. In a type-writer, the combination of a type-bar, a pivot therefor, a springy screw-pin connected to said pivot, and an externally and internally threaded nut engaging the threaded end of said spring-pin and adjustably mounted in an opening in the frame out of the plane of the pivot, as set forth.

32. In a type-writer, the combination of a type-bar, a pivot therefor, a screw-pin connected to said pivot, and an externally and internally threaded nut adjustably mounted in a threaded opening of the frame and engaging the threaded portions of said pin; the internal and external threads of said nut being of different pitch, as set forth.

33. In a type-writer, the combination of a type-bar, a pivot therefor, a screw-pin connected to said pivot, and a nut having external and internal screw-threads engaging respectively the screw-pin and an opening in the frame; one of said threads being a right-hand and the other a left-hand thread, as set forth.

34. In a type-writing machine, the combination of a carriage, a platen journaled therein, a feed-roll provided with a ratchet-wheel, a pawl adapted to operate the ratchet-wheel, a pivoted lever formed with a finger which is adapted to engage and arrest the movement of the ratchet-wheel, and a lug on the pawl adapted to operate said lever, as set forth.

JOHN N. WILLIAMS.

Witnesses:
    WM. E. KNIGHT,
    M. V. BIDGOOD.